Patented Sept. 19, 1950

2,522,590

UNITED STATES PATENT OFFICE 2,522,590

PHOTOCHEMICAL REACTION OF UNSATURATED ETHERS WITH ALIPHATIC MERCAPTANS

William E. Vaughan and Frederick F. Rust, Berkeley, Calif., assignors to Shell Development Company, San Francisco, Calif., a corporation of Delaware No Drawing. Application March 28, 1945, Serial No. 585,389

4 Claims. (Cl. 204—158)

The present invention relates to a process for the preparation of certain organic compounds containing both oxyether and thioether linkages. More particularly, the invention pertains to a novel process for the interaction of unsaturated symmetrical or unsymmetrical ethers with aliphatic mercaptans. The word "ether" as employed herein and in the appended claims refers both to oxyethers and to thioethers. In one of its more specific embodiments the invention covers the preparation of polyethers by reacting aliphatic mercaptans with symmetrical or unsymmetrical oxyethers or thioethers containing unsaturated linkages of aliphatic character in each of the radicals attached to the ether oxygen atom or to the thioether sulfur atom. The invention is also directed to a novel method of effecting a controlled reaction between aliphatic mercaptans and oxyethers in which each of the organic radicals attached to the ether oxygen atom contains at least one unsaturated linkage of aliphatic character, i. e. a double or triple bond which is preferably between the carbon atoms farthest removed from the ether oxygen atom to produce novel addition products of a predetermined character. The invention also includes a certain novel class of linear polyethers containing both oxyether and thioether linkages.

This application is a continuation-in-part of our pending patent application Serial No. 395,762, filed May 29, 1941, now Patent No. 2,392,294.

It is known that thioethers may be produced by subjecting mixtures of suitable mercaptans and unsaturated hydrocarbons to elevated temperatures in the neighborhood of from 200° C. to 700° C. In some cases such reactions were effected at superatmospheric pressures. When the reactions are effected at such temperatures and pressures the sulfur of the mercapto group or radical attaches predominantly to the unsaturated carbon atom holding the most hydrogen atoms. In other words, this addition takes place contrary to the course suggested by the Markownikoff rule and is therefore designated as "abnormal" addition on the assumption that mercaptans should add like halogen acids. It is also known that the abnormal addition of mercaptans to unsaturated hydrocarbons is catalyzed by free oxygen, air, ozone, peroxides, ascaridole and the like, and that compounds of the type of hydroquinone and piperidene act as reaction inhibitors.

It has now been discovered that unsaturated ethers of the class more fully described hereinbelow may be reacted with aliphatic mercaptans to effect a rapid and efficient conversion to certain polyethers, this reaction being substantially solely via abnormal addition and being effected in the absence of any compound or substance the presence of which was heretofore considered necessary for promoting or catalyzing the mentioned abnormal addition reaction. Also, this interaction of unsaturated ethers with aliphatic mercaptans to produce polyethers is effected according to the present process without the necessity of resorting to high temperatures and/or elevated pressures.

Broadly stated, the process of the present invention resides in the photochemical addition of aliphatic mercaptans to unsaturated oxyethers or unsaturated thioethers under the deliberate influence of ultraviolet radiations, this reaction being effected without the necessity of applying heat, and therefore being preferably realized at normal temperatures, i. e. in the neighborhood of from about 25° C. to about 15° C., or even at considerably lower temperatures. More particularly stated, the reaction is effected under the influence of light rays having wave-lengths below about 2900 to 3000 Angstrom units. It has been still further discovered that these light rays strongly catalyze the photochemical addition of the mercaptans, this addition, in the absence of any compound or substance heretofore considered necessary for promoting or catalyzing such reaction, being preponderantly if not wholly via the above-defined "abnormal" addition and therefore in accordance with the rule proposed by Posner (Berichte, v. 38, 646; 1904). Therefore, the photochemical reaction taking place under the deliberate influence of ultraviolet radiations offers a direct, efficient and very rapid method for obtaining primary polyethers from oxyethers, thioethers or oxythioethers containing the terminally unsaturated carbon atom. The process of the invention is applicable to the reaction of aliphatic mercaptans with any ether (i. e. oxy- and/or thioether) which contains one or more olefinic and/or acetylenic linkages. In other words, any ether containing one or more unsaturated linkages between two carbon atoms of aliphatic character may be reacted with an aliphatic mercaptan or aliphatic mercaptans in accordance with the process of the present invention.

One group of such unsaturated ethers comprises the aliphatic oxyethers in which only one of the aliphatic radicals attached to the ether oxygen atom contains an unsaturated linkage.

Examples of such ethers are ethyl vinyl ether, ethyl propenyl ether, methyl isopropenyl ether, ethyl isopropenyl ether, methyl allyl ether, ethyl allyl ether, n-propyl allyl ether, isopropyl allyl ether, 4-ethoxy-butene-1, 6-ethoxy-hexene-1, gamma - ethoxy - alphabutylene, methyl propargyl ether, ethyl propargyl ether, etc., and their homologs and analogs. The above unsaturated ethers and their various homologs may be substituted by straight-chain, cyclic and/or heterocyclic radicals, as well as by halogens. The following are examples of such halogenated unsaturated ethers which may be reacted with hydrogen sulfide in accordance with the process of the present invention: ethyl alpha-chlorovinyl ether, ethyl beta-chlorovinyl ether, ethyl alpha,beta-dichlorovinyl ether, methyl beta,beta-dichlorovinyl ether, ethyl beta,beta-dichlorovinyl ether, ethyl beta,beta-dibromovinyl ether, 2-methoxy-3,3-dichloropropene-1, 2-ethoxy-3,3-dichloropropene-1, 2-propyloxy-3,3-dichloropropene-1, ethyl gamma-chloroallyl ether, methyl gamma-bromoallyl ether, ethyl beta,gamma-dibromo-allyl ether, and their homologs and analogs.

Another group of suitable unsaturated ethers which may be employed as starting materials comprises the aliphatic thioethers in which only one of the radicals attached to the thioether sulfur atom contains an unsaturated linkage. Examples of this group are: ethyl vinyl sulfide, ethyl isopropenyl sulfide, and the like, their homologs and analogs, as well as suitable substitution products.

Still another group of ethers which may be employed as the primary material comprises or includes the aliphatic oxyethers in which both radicals attached to the ether oxygen atom contain unsaturated olefinic and/or acetylenic linkages. The following are illustrative examples of such polyunsaturated oxyethers: divinyl ether, diisopropenyl ether, diallyl ether, dicrotyl ether, dimethallyl ether, di(alpha-methyl-allyl) ether, (butene-1-yl-3) (butene-2-yl-1) ether, di(pentene-2-yl-4 ether, dihexenyl ethers, allyl (2-methyl-pentene-4-yl-2) ether, allyl linalyl ether, etc., and their homologs, analogs and suitable substitution products, such as the halogenated derivatives of the type of hexachlorodivinyl ether, di(beta-bromoallyl) ether, di(beta,gamma-diiodoallyl) ether, and the like. Also, the corresponding thioethers in which each radical attached to the sulfur atom contains an unsaturated linkage between two carbon atoms of aliphatic character may be reacted with aliphatic mercaptans in accordance with the process of the present invention. The following are illustrative examples of this group of thioethers: divinyl sulfide, di(betachlorovinyl) thioether, diallyl sulfide, dicrotyl sulfide, dimethallyl sulfide, dihexenyl sulfides, and the like, and their homologs and analogs.

The ethers employed as the starting material may also contain more than one ether oxygen atom and/or thioether sulfur atom, this group of unsaturated ethers being represented by compounds of the type of 1,2-bis-(vinyloxy) ethane, 1,3-bis-(vinyloxy) propane, 1,2-bis-(allyloxy) ethane, and the like.

The invention is particularly applicable to the reaction of suitable aliphatic mercaptans with unsaturated ethers (i. e. oxyethers and thioethers) in which one or both radicals attached to the oxygen or sulfur atom have a terminal aliphatic unsaturated linkage. When such unsaturates are reacted with suitable aliphatic mercaptans in accordance with the process of the present invention, i. e. photochemically and under the influence of ultraviolet radiations, the reaction product predominates in or consists substantially solely of primary thioethers.

Any sufficiently stable aliphatic mercaptan is suitable as a reactant to be employed in the photochemical addition thereof to the defined class of unsaturated ethers. A suitable aliphatic mercaptan may contain one or more sulfhydryl groups or radicals. In the majority of cases it is preferable to employ the normal or isoalkyl chain mercaptans of primary, secondary or tertiary character, particularly those contained in or derived from petroleum or petroleum products. The methyl, ethyl, butyl, amyl, hexyl, heptyl, octyl, lauryl and the like mercaptans, as well as their homologs, analogs and substitution products, may be employed with excellent results.

Another group of mercaptans which may be used as one of the two reactants comprises or includes the dimercaptans and particularly the polymethylene dimercaptans of the general formula $HS(CH_2)_nSH$. This group of mercaptans may be reacted with, for example, ethers containing a plurality of unsaturated linkages to produce thioethers having a high molecular weight. A particularly suitable group of unsaturated ethers which may be employed with these dimercaptans comprises or includes the aliphatic oxyethers or thioethers (and their products of substitution) which contain unsaturated linkages in alpha and omega positions, i. e. in terminal positions in each of the radicals attached to the ether oxygen (or sulfur) atom. Due to the "abnormal" addition reaction, the resulting products predominate in or consist of polyethers. When each of the radicals of the ether contains a terminal double or triple bond, the treatment of such ethers with the mentioned polymethylene dimercaptans of the above-defined class in accordance with the process of the present invention will form a reaction product containing principally primary polyethers. For instance, diallyl ether may be reacted with a dimercaptan to produce high molecular weight compounds which contain both ether oxygen atoms and thioether sulfur atoms in the chain. Instead of employing aliphatic straight-chain polyunsaturated ethers, it is also possible to use branch-chain ethers, as well as ethers containing alicyclic, aryl, aralkyl and similar radicals which may or may not be further substituted, e. g. halogenated, provided such ethers contain at least one unsaturated linkage between two carbon atoms of aliphatic character. In order to produce the above-mentioned high molecular weight addition compounds, the unsaturated ethers to be treated in accordance with the process of this invention should preferably have at least one such unsaturated linkage of aliphatic character in each of the radicals attached to the ether linkage. However, other polyunsaturated ethers may also be used to produce branch-chain polyethers having high molecular weights.

The reaction of the mercaptans (which term also includes the poly-mercaptans such as the mentioned polymethylene dimercaptans) with the above-defined class of unsaturated ethers under the influence of ultraviolet radiations may be effected in the vapor phase, in the liquid phase, or in a two-phase liquid-vapor system. Since the abnormal addition of the mercaptan according to the process occurs photochemically, no heating is necessary. In fact, and in view of the exothermic character of the addition reaction, resort to cooling is frequently advisable. The reaction may be realized at atmospheric temperature, i. e. between about 15° C. and about 25° C. or at somewhat higher temperatures. It may be frequently effected at temperatures as low as 0° C. or even lower. Obviously, the reaction temperature must be above that at which the reactants solidify.

The photochemical reaction may be effected at any pressure. However, it is generally preferable to employ superatmospheric pressures which are at least sufficient to maintain the reactants or at least one of them in the liquid state. This is because the conversion rate appears to be accelerated when the reaction is effected in the liquid phase.

Although the reaction described herein may be promoted by using the whole range of ultraviolet radiations, the most effective wave-lengths of light which catalyze the desired addition of mercaptans appear to lie in that portion of the spectrum which is below about 3200 A. U. and more particularly in the region of about 2900 A. U. and below. In fact, the interposing of an ordinary window glass filter (which has a lower limit of transmission of about 3300 A. U.), or of a Pyrex glass filter having a lower transmission limit of about 2900 to 3000 A. U. in the path of light coming from a source emanating ultraviolet radiations, will cause a substantial, if not complete, inhibition of the reaction unless some sensitizing material such as an organic peroxide or a ketone is added. On the other hand, the use of quartz vessels for the reaction according to the process of the present invention allows efficient addition of hydrogen sulfide due to the fact that quartz transmits ultraviolet rays considerably below 2900 A. U.

The reaction may be effected in a batch, intermittent or continuous manner. When effected by the batch method, the reactants may be introduced into a suitable container, these reactants being maintained in the container either in a liquid or vapor state or in a mixed liquid-vapor state. The container may then be illuminated by ultraviolet light for a period of time sufficient to effect the desired addition reaction. Since ordinary glass or Pyrex glass will not permit the substantial transmission of effective light waves, namely those in the neighborhood of 2900 to 3000 A. U. and below, it is preferred to construct the container of quartz or other suitable light-transmitting materials such as calcium fluoride or at least to provide these containers with one or more openings or windows of quartz, calcium fluoride or the like through which the reactants in the interior of the container may be illuminated with ultraviolet rays. In case of a continuous process the reactants, e. g. the mercaptan and the unsaturated ether, may be conveyed in the liquid, vapor or mixed state through the interior of a reaction chamber which may be of a sufficient length to permit an adequate residence time for the reactants. These reactants may be subjected to ultraviolet radiations emanating from a source or sources disposed within or without the reaction chamber. In the former case the reactor may be constructed of any material which is impervious to light, such as steel or the like, the source of ultraviolet radiations being disposed within the chamber and in the path of the reactants passing therethrough. Instead of introducing both of the reactants together, it is also possible to convey one of the reactants, for example the unsaturated ether, through the whole length of the reactor tube while feeding in the other reactant, i. e. an aliphatic mercaptan either in the liquid or the vapor state, at various intermediate points. This permits control of the reaction temperature and of the concentration of the reactants in the reaction zone. The discharged reaction products may be treated by any known or suitable means or methods for the separation and recovery of the desired addition and/or polyaddition products.

A useful group of novel compounds which may be prepared according to the process of the present invention comprises linear mixed polyethers which may be defined as having the general formula $R_1$—S—$R_2$—O—$R_3$ wherein $R_1$ and $R_2$ are alkyl radicals attached to the sulfur atom via primary carbon atoms, while $R_3$ represents either an aliphatic radical or an aliphatic thioether radical. The products formed by the interaction of diallyl ether with, for instance, ethyl mercaptan may be considered as specific examples of polyethers of this subgroup. Thus, depending on whether only one or two molecules of the ethyl mercaptan react with a single molecule of the diallyl ether, the reaction product will be either

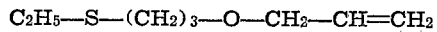
or
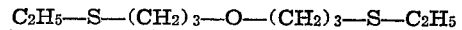

Another specific example of this group is the reaction product obtained by the interaction of a monounsaturated oxyether, e. g. ethyl vinyl ether, with an aliphatic mercaptan such as lauryl mercaptan, this product having the general structural formula $C_{12}H_{25}$—S—$C_2H_5$—O—$C_2H_5$.

Depending on their molecular weights and the starting reactants, the novel class of polyethers, as well as other polyethers produced in accordance with the present process, range through compounds (or mixtures of compounds) which are fluids or oleaginous, viscous or wax-like solids. The properties possessed by these polyether compounds adapt them admirably for various uses. They are well suited as synthetic lubricating oils or greases, or as coating or impregnating materials alone or in solution together with solvents and/or other compounding agents. They are also satisfactory as blending agents in lubricants including greases, as plasticizers, hydraulic fluids and coolants, as well as ingredients in the manufacture of cosmetics, polishes, soaps, and for many other uses which will be evident from their chemical and physical characteristics.

The invention is illustrated by the following examples, it being understood that there is no intention of being limited by any details thereof, since many apparent variations may be made.

*Example I*

Lauryl mercaptan and diallyl ether used in a molar ratio of 2:1 were introduced into an open quartz container and subjected to illumination from a 400-watt quartz mercury arc lamp disposed at a distance of about 6 inches from the reactants. The irradiation was continued for about one hour. The reaction product was then subjected to distillation under a vacuum. It was found that approximately 80% of this reaction product boiled above 100° C. at a pressure of 2 mm. (absolute). This high-boiling fraction had a viscosity index of 213, a pour point of about —20° C., a viscosity less than that of an S. A. E. 10 oil, and a molecular weight of about 359. This corresponds to a mixture consisting of about 75% of a product formed by the addition of one molecule of lauryl mercaptan to each molecule of diallyl ether, and about 25% of a product in which two molecules of lauryl mercaptan reacted with each molecule of diallyl ether. The mono- and di-addition products were separated by repeated fractional crystallization from acetone at about −30° C. The solid precipitate thus obtained constituting the di-addition compound having the formula $$(C_{12}H_{25}-S-CH_2-CH_2-CH_2)_2O$$

was a waxy white compound having the following properties:

| | |
|---|---|
| Melting point _____ ° C__ | 34.0 to 34.5 |
| Viscosity at 100° F. in centistokes_____ | 66.32 |
| Viscosity at 210° F. in centistokes _____ | 12.88 |
| Viscosity index (of liquid)_____ | 185 |
| Sulfur _____ weight percent__ | 12.5 |
| Carbon content _____ percent__ | 71.9 |
| Hydrogen content _____ percent__ | 12.5 |

The mono-addition product had a molecular weight of 315 and a viscosity index of 52.

Example II

When diallyl ether is reacted with ethylene dithioglycol (employed in equimolar amounts) under the above conditions, high molecular addition products are obtained.

Example III

Di-(beta-mercapto ethyl) ether and diallyl ether were reacted in substantially equimolar amounts, the interaction being effected photochemically under the deliberate influence of ultra-violet radiations emanating from a quartz mercury arc lamp. The reaction was continued for about one hour during which time the volume of the reactants in the quartz vessel decreased by about 15%. The reaction product was a water-white, viscous and easily foaming liquid. This product was subjected to distillation to produce a residual fraction boiling above 240° C. at a pressure of 8 mm. This residual fraction had the following properties:

| | |
|---|---|
| Molecular weight _____ | 871 |
| Micro pour point _____ °C__ | −39 |
| Sulfur _____ weight percent__ | 28.5 |
| Mercaptan, as sulfur _____do____ | 6.6 |
| Viscosity Index _____ | 151 |
| SAE (Viscosity) No. _____ | 20 |

Example IV

When ethyl vinyl ether is reacted with lauryl mercaptan under the deliberate influence of ultra-violet radiations of below about 2900 to 3000 A. U., the reaction product contains dodecyl, beta-ethoxy-ethyl thioether.

We claim as our invention:

1. In a process for the production of a linear polyether, the steps comprising subjecting a mixture of diallyl ether and bis(beta-mercaptoethyl) ether to light radiations having a wave length below 3000 Angstrom units until products boiling above 240° C. at 8 mm. pressure are produced, and recovering such products.

2. In a process for the production of a linear polyether, the steps comprising subjecting a mixture of a bis(mercaptoethyl) ether and a dialkenyl ether containing both double bonds in the form of terminal $=CH_2$ groups to light radiations having a wave length of below 3000 Angstrom units until products boiling above 240° C. at 8 mm. pressure are produced, and recovering such products.

3. In a process for the production of a linear polyether, the step comprising subjecting a mixture of a dialkenyl ether and a member of the group consisting of bis(mercaptoethyl) ethers and alkylene dithiols to light radiations having a wave length below 3000 Angstrom units until products boiling above 240° C. at 8 mm. pressure are produced, and recovering such products.

4. In a process for the production of a linear polyether, the step comprising subjecting a mixture of an aliphatic dimercaptan and an unsaturated ether containing an unsaturated linkage between two carbon atoms of aliphatic character in each of two hydrocarbon radicals joined by an oxy group to light radiations having a wave length below 3000 Angstrom units until products boiling above 240° C. at 8 mm. pressure are produced, and recovering such products.

WILLIAM E. VAUGHAN.
FREDERICK F. RUST.

REFERENCES CITED

The following references are of record in the file of this patent:

UNITED STATES PATENTS

| Number | Name | Date |
|---|---|---|
| 2,216,751 | Rosen _____ | Oct. 8, 1940 |
| 2,369,612 | Schirm _____ | Feb. 13, 1945 |
| 2,392,294 | Rust et al. _____ | Jan. 1, 1946 |